US009628217B1

(12) United States Patent
Rockway et al.

(10) Patent No.: US 9,628,217 B1
(45) Date of Patent: Apr. 18, 2017

(54) COMB LIMITER COMBINER WITH SUB-BAND INTERFERENCE NEGATION

(71) Applicant: Office of Intellectual Property, Code 36000, San Diego, CA (US)

(72) Inventors: John W. Rockway, San Diego, CA (US); Jia-Chi Chieh, San Diego, CA (US); Jeanne Quimby, Erie, CO (US); John D. Rockway, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/260,052

(22) Filed: Sep. 8, 2016

(51) Int. Cl.
*H04B 1/18* (2006.01)
*H04K 3/00* (2006.01)
*H04B 1/713* (2011.01)

(52) U.S. Cl.
CPC .............. *H04K 3/25* (2013.01); *H04B 1/713* (2013.01)

(58) Field of Classification Search
CPC ......... H04L 27/30; H04B 1/10; H04B 1/7097; H04B 7/02

USPC ........ 375/132, 136, 349, 350, 260; 455/130, 455/132, 303, 306, 280, 283
See application file for complete search history.

(56) References Cited

U.S. PATENT DOCUMENTS

| 6,211,732 | B1 * | 4/2001 | Maiuzzo ................. H03F 3/211 330/124 R |
| 6,549,560 | B1 | 4/2003 | Maiuzzo et al. |
| 7,830,991 | B2 | 11/2010 | Dishman et al. |
| 7,889,021 | B2 * | 2/2011 | Maiuzzo .............. H04B 1/1036 333/12 |
| 8,005,452 | B2 | 8/2011 | Maiuzzo |
| 8,064,555 | B1 | 11/2011 | Rockway et al. |
| 8,412,142 | B2 * | 4/2013 | Walley ................. H04B 1/0003 375/324 |
| 8,798,560 | B2 * | 8/2014 | Walley ................. H04B 1/0003 370/338 |

* cited by examiner

*Primary Examiner* — Sonny Trinh
(74) *Attorney, Agent, or Firm* — SPAWAR Systems Center Pacific; Kyle Eppele

(57) ABSTRACT

Aspects of the present invention provide a system and method for using a filter controller and an adjustable narrow-band filter within each sub-band of a communication system. If a channel of the sub-band is being jammed, the filter controller will adjust the adjustable narrow-band filter to notch-filter out only the channel of the sub-band that is being jammed. In this manner, the remaining channel of the sub-band may be used for communication.

20 Claims, 5 Drawing Sheets

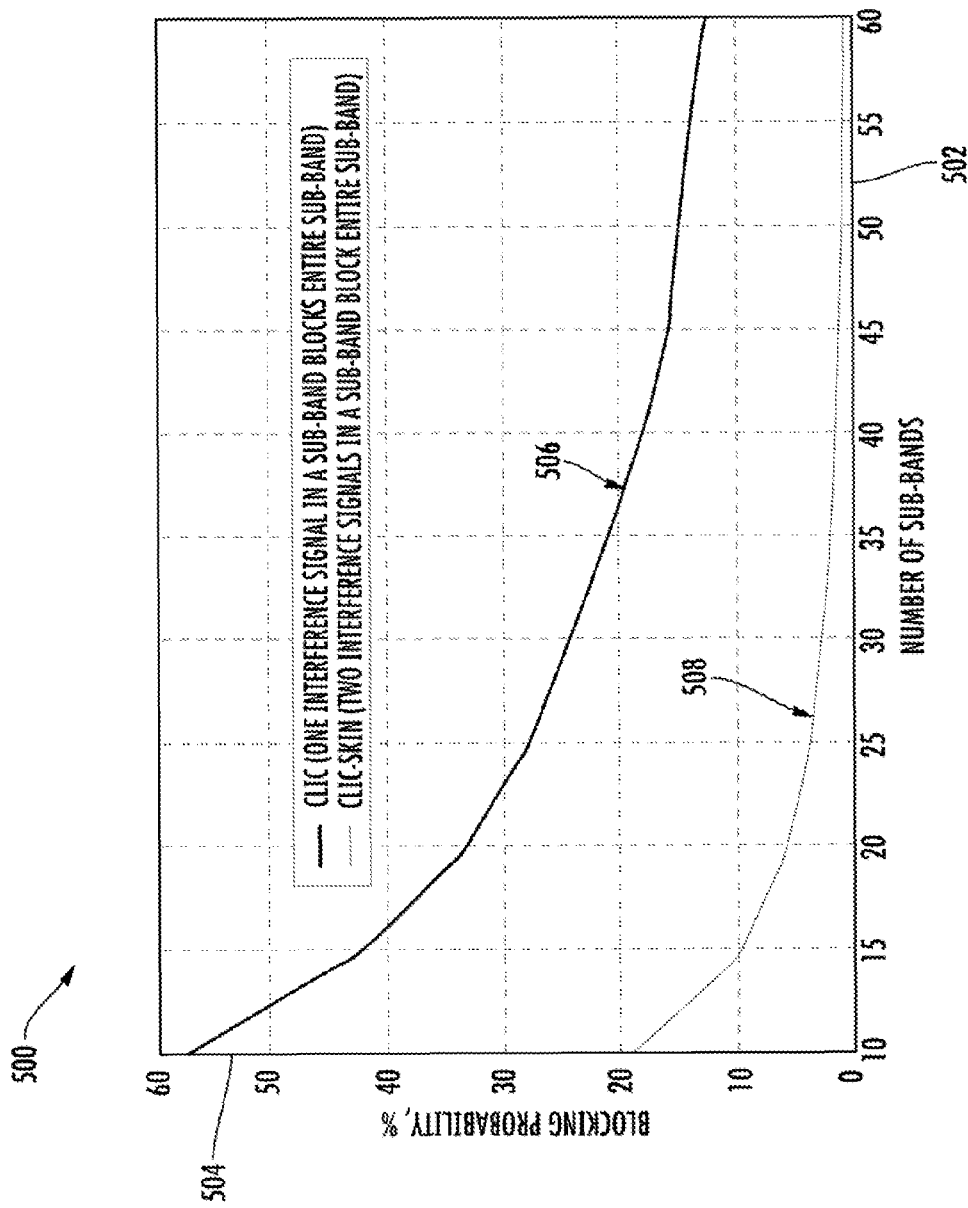

COMB LIMITER COMBINER WITH SUB-BAND INTERFERENCE NEGATION

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102,517.

BACKGROUND OF THE INVENTION

Embodiments of the invention relate to using a Comb Limiter Combiner along with Frequency Hopping Spread Spectrum (FHSS) modulation to minimize the unauthorized interception or jamming of radio signals. FHSS modulation is a method of transmitting and receiving radio signals by rapidly switching the carrier among frequency channels, using a pseudo random algorithm known to both the transmitter and receiver.

A transmitter spreads the radio signal over a frequency band that is much wider than what is required by the radio signal and operates in synchronization with the receiver, which remains tuned to the same frequency as the transmitter. The transmitter will transmit a short burst of data at a given frequency which will be received by the receiver. Then the transmitter and receiver will both "hop" to a different frequency to transmit and receive another burst of data.

FHSS modulation of radio signals is advantageous to other techniques since its transmissions are difficult to intercept if the pseudo random algorithm used to hop between frequencies is not known.

SUMMARY OF THE INVENTION

An aspect of the present invention is drawn to a receiver including an input terminal, a first input band pass filter, a second input band pass filter, a first signal processor, a second signal processor, a first adjustable band pass filter, a second adjustable band pass filter, a controller, a tuner and an output port. The input terminal receives a received signal having a frequency within a bandwidth. The first input band pass filter is arranged to receive the received signal and can pass signals within a first channel of the bandwidth. The second input band pass filter is arranged to receive the received signal and can pass signals within a second channel of the bandwidth, wherein the second channel of the bandwidth is mutually exclusive with the first channel of the bandwidth. The first signal processor generates a first processed signal based on the received signal. The second signal processor generates a second processed signal based on the received signal. The first adjustable band pass filter is arranged to receive the signals within the first channel of the bandwidth of the first input band pass filter and can pass signals within a first sub-channel of the first channel of the bandwidth and can pass signals within a second sub-channel of the first channel of the bandwidth, wherein the second sub-channel of the first channel of the bandwidth is mutually exclusive with the first sub-channel of the first channel of the bandwidth. The second adjustable band pass filter is arranged to receive the signals within the second channel of the bandwidth of the second input band pass filter and can pass signals within a first sub-channel of the second channel of the bandwidth and can pass signals within a second sub-channel of the second channel of the bandwidth, wherein the second sub-channel of the second channel of the bandwidth is mutually exclusive with the first sub-channel of the second channel of the bandwidth. The controller detects when the received signal is within the first sub-channel of the first channel of the bandwidth and has an amplitude greater than a first threshold, detects when the received signal is within the second sub-channel of the first channel of the bandwidth and has an amplitude greater than a second threshold, detects when the received signal is within the first sub-channel of the second channel of the bandwidth and has an amplitude greater than a third threshold, and detects when the received signal is within the second sub-channel of the second channel of the bandwidth and has an amplitude greater than a fourth threshold. The controller can further output a first filter signal when the received signal is within the first sub-channel of the first channel of the bandwidth and has an amplitude greater than a first threshold, can output a second filter signal when the received signal is within the second sub-channel of the first channel of the bandwidth and has an amplitude greater than a second threshold, can output a third filter signal when the received signal is within the first sub-channel of the second channel of the bandwidth and has an amplitude greater than a third threshold and can output a fourth filter signal when the received signal is within the second sub-channel of the second channel of the bandwidth and has an amplitude greater than a fourth threshold. The tuner generates a tuning signal based on a predetermined function. The output port outputs an output signal based on the first processed signal, the second processed signal, the first filter signal, the second filter signal, the third filter signal, the fourth filter signal and the tuning signal.

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 5 illustrates a graph of the probability of a sub-band being blocked versus the number of sub-bands for a frequency hopping communication system in accordance with aspects of the present invention.

DETAILED DESCRIPTION OF THE EMBODIMENTS

In prior art communications systems that use frequency hopping, the total usable spectrum is divided into smaller frequency sub-bands. Due to the hardware and system architecture requirements for each sub-band, only a limited number of sub-bands may be implemented into a communications system.

Since only a limited number of frequency sub-bands can be implemented into a communications system using frequency hopping, any interference or jamming within a frequency sub-band will render the sub-band unusable. As such, the channel of the signal that is transmitted on an unusable sub-band will be lost.

A prior art frequency hopping communication system will now be described with reference to FIG. 1.

Figure 1:
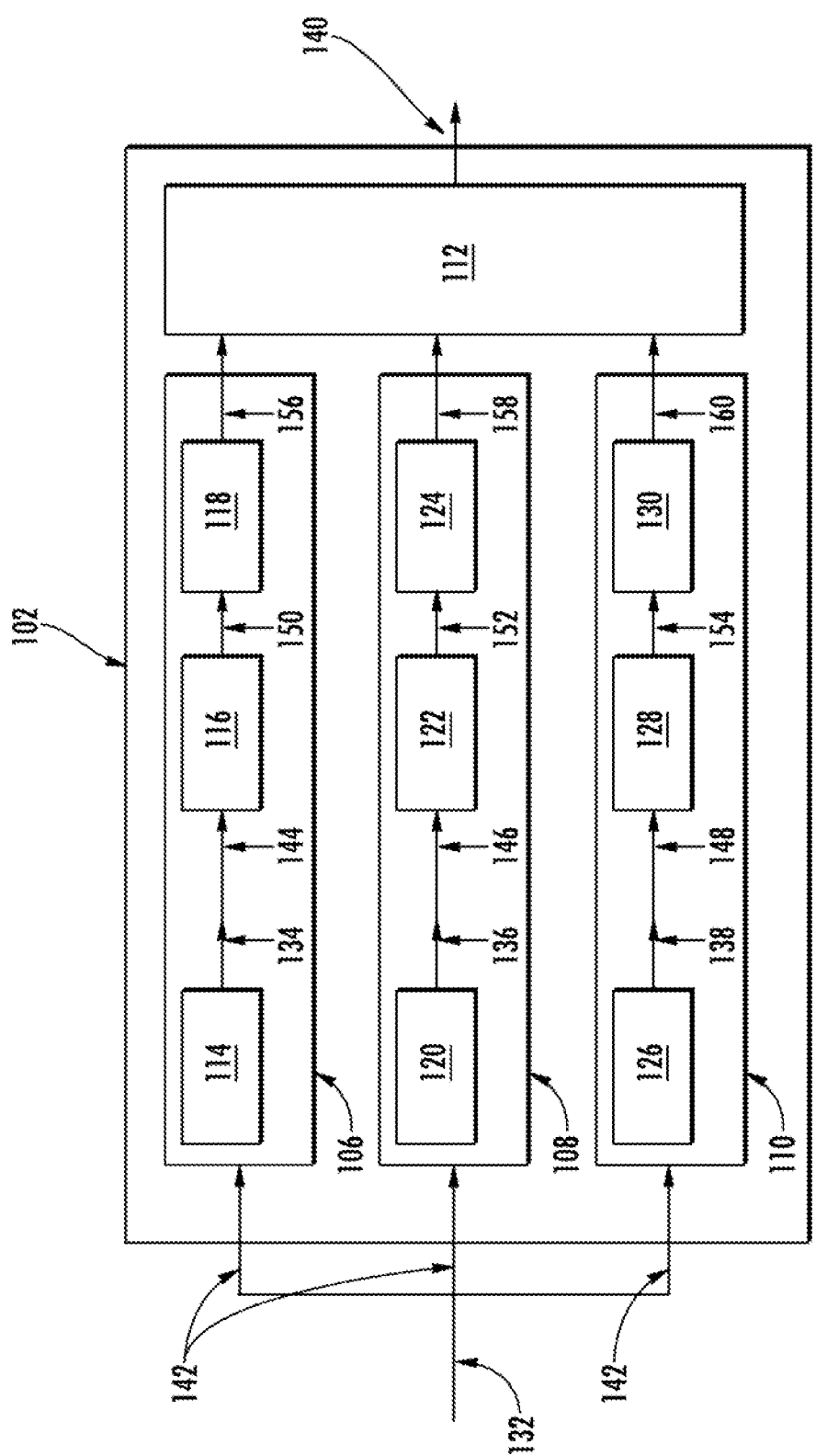
FIG. 1 illustrates a prior art frequency hopping receiver.

FIG. 1 illustrates a prior art frequency hopping receiver 102.

As illustrated in the figure, receiver 102 includes a sub-band processing channel 106, a sub-band processing channel 108, a sub-band processing channel 110, and a combiner 112. Sub-band processing channel 106 further includes a band pass filter (BPF) 114, a limiter 116, and a band pass filter (BPF) 118. Sub-band processing channel 108 further includes a band pass filter (BPF) 120, a limiter 122, and a band pass filter (BPF) 124. Sub-band processing channel 110 further includes a band pass filter (BPF) 126, a limiter 128, and a band pass filter (BPF) 130.

Sub-band processing channel 106 is the first frequency sub-band of the entire frequency spectrum that can be received and processed by receiver 102.

Band pass filter 114 receives signal 132, via communication line 142. Band pass filter 114 filters out any frequency component of signal 132 that is not handled by sub-band processing channel 106, in order to create a filtered signal 134. Band pass filter 114 transmits filtered signal 134 to limiter 116, via communication line 144. For example, band pass filter 114 may pass a band of 3-11 GHz.

Limiter 116 modifies filtered signal 134 in order to keep the amplitude of filtered signal 134 below the limiting threshold of downstream components (not shown). Limiter 116 additionally transmits filtered signal 134 to band pass filter 118, via communication line 150.

Band pass filter 118 filters out any frequency component of filtered signal 134 that is not handled by sub-band processing channel 106 and that might have been created by sub-band processing channel 106. Band pass filter 118 transmits filtered signal 134 to combiner 112, via communication line 156.

Sub-band processing channel 108 functions in a similar way as sub-band processing channel 106. However, sub-band processing channel 106 processes a second frequency sub-band of the entire frequency spectrum that can be received and processed by receiver 102.

As such, band pass filter 120 receives signal 132, via communication line 142. Band pass filter 120 filters out any frequency component of signal 132 that is not handled by sub-band processing channel 108, in order to create a filtered signal 136. For example, band pass filter 120 may pass a band of 12-20 GHz.

Band pass filter 120 transmits filtered signal 136 to limiter 122, via communication line 146. Limiter 122 modifies filtered signal 136 in order to keep the amplitude of filtered signal 136 below the limiting threshold of downstream components. Limiter 122 additionally transmits filtered signal 136 to band pass filter 124, via communication line 152. Band pass filter 124 filters out any frequency component of filtered signal 136 that is not handled by sub-band processing channel 108. Band pass filter 124 transmits filtered signal 136 to combiner 112, via communication line 158.

Sub-band processing channel 110 additionally functions in a similar way as sub-band processing channel 106. However, sub-band processing channel 110 processes a third frequency sub-band of the entire frequency spectrum that can be received and processed by receiver 102.

As such, band pass filter 126 receives signal 132, via communication line 142. Band pass filter 126 filters out any frequency component of signal 132 that is not handled by sub-band processing channel 110, in order to create filtered signal 138. Band pass filter 126 transmits filtered signal 138 to limiter 128, via communication line 148. For example, band pass filter 126 may pass a band of 20-30 GHz.

Limiter 128 modifies filtered signal 138 in order to keep the amplitude of filtered signal 138 below the limiting threshold of downstream components (not shown). Limiter 128 additionally transmits filtered signal 138 to band pass filter 130, via communication line 154. Band pass filter 130 filters out any frequency component of filtered signal 138 that is not handled by sub-band processing channel 110. Band pass filter 130 transmits filtered signal 138 to combiner 112, via communication line 160.

It should be noted that receiver 102 is illustrated and described as having only three sub-band processing channels. This is provided for purposes of brevity of discussion. Any number of sub-band processing channels may be provided in order to process a predetermined bandwidth and to process a predetermined number of channels of such a predetermined bandwidth. It should also be noted that as the number of sub-band processing channels increases, the size of the receiver increases in addition to the power needed to operate such a receiver.

The components of receiver 102 create what is known as a comb limiter combiner. In the comb limiter combiner, each band pass filter within a single band creates a passband that spans the total receiver bandwidth. Each band pass filter that is able to receive signal 132 is connected to a corresponding limiter that has a threshold substantially equal to the limiting threshold of downstream components (not shown), which is chosen to prevent the desensitization of further processing components (not shown).

Combiner 112 generates signal 140 based on one of filtered signal 134, filtered signal 136, or filtered signal 138. Combiner 112 transmits signal 140 to downstream components (not shown).

In operation, receiver 102 will be used to provide information to downstream components (not shown). The information to be transmitted will be used to create signal 132. The information to be transmitted is placed in each frequency sub-band of the total available frequency spectrum, in this example embodiment, the sub-bands correspond to sub-band processing channel 106, sub-band processing channel 108, and sub-band processing channel 110. Once signal 132 is generated, it is then provided to each of band pass filter 114, band pass filter 120, and band pass filter 126, via communication line 142.

At this point, combiner 112 has received each of filtered signal 134, filtered signal 136, and sub signal 138. Since receiver 102 uses frequency hopping to transmit information, it uses a pseudo random algorithm (known to the transmitting source) to determine which frequency to use at any given time. Receiver 102 uses the same algorithm so that the transmitting source transmits a signal on the same frequency on which receiver 104 receives a signal at the same time.

Consider a normal receiving situation where a transmitter (not shown) is transmitting information, for receipt by receiver 102, by periodically hopping through a plurality of frequencies with a predetermined band "frequency hopping," in a manner known to receiver 102. In this manner, receiver 102 can correspondingly periodically hop through enabling appropriate receiving bands in order to receive the information transmitted by the transmitter.

Now further consider that a third party (not shown) attempts to disrupt the transfer of information from the transmitter (not shown) to receiver 102 by blasting a high power signal in order to damage the components of receiver 102. Such a high power signal may be a specific frequency, a band of frequencies, may be a periodically changing frequency or any combination thereof. In any event, presume that at some time, at least one of the received signals as transmitted by the transmitter will be of the same frequency of the high power signal blasted by the third party.

Consider an instance where signal 132 has a single frequency component that is below the predetermined threshold. In such an instance, signal 132 should not damage any components of receiver 102 and should therefore be processed. For purposes of discussion, in this instance, let signal 132 have a single frequency component within sub-band processing channel 106.

Input band pass filter 114 receives signal 132. Input band pass filter 114 only allows the channel of signal 132 that is within its sub-band to pass through in order to generate filtered signal 134. Once generated, filtered signal 134 is transmitted to limiter 116.

Limiter 116 will then clip peak amplitudes of filtered signal 134 to avoid exceeding the linear response of the receiver and creating desensitization. Limiter 116 will then transmit filtered signal 134 to output band pass filter 118, via communication line 150.

Output band pass filter 118 will then filter out any channel of filtered signal 134 that is not within its sub-band. Output band pass filter 118 prevents any out of band intermodulation products generated by limiter 116. After filtering filtered signal 134, output band pass filter 118 will transmit filtered signal 134 to combiner 112, via communication line 156.

As signal 132 changes frequency, limiter 122 transmits filtered signal 136 to combiner 112, via communication line 158, and limiter 122 transmits filtered signal 138 to combiner 112, via communication line 160 as appropriate.

Combiner 112 should only receive one of each of filtered signal 134, filtered signal 136, and filtered signal 138 at any one time. Since combiner 112 is transmitting at the frequency of sub-band processing channel 106, it uses filtered signal 134 to generate processed signal 330 and ignores sub-signal 326 and sub-signal 328. Once generated, combiner 112 transmits signal 140.

At future times, the appropriate channel of signal 132 will be received at a frequency that is within sub-band processing channel 108 or 110.

Now consider a jamming situation wherein signal 132 has a single frequency component that sufficiently high to damage components of receiver 102 or interfere with the signal processing of receiver 102—e.g., a third party is attempting to jam receiver 102 by blasting a high powered signal that is the same frequency of as the signal transmitted by the transmitter. In such a case, signal 132 might damage components of receiver 102, may damage downstream components (not shown) and should therefore be filtered. For purposes of discussion, in this case, let signal 132 have a single frequency component within sub-band processing channel 106. In some cases band pass filter 114 may be controlled to prohibit all signals within its usual pass band in order to filter the frequency component of signal 132 that has a large amplitude.

By "turning off" sub-band processing channel 106 in such instances, the components of receiver 102 within sub-band processing channel 106 may be spared of damage from the jamming signal. Unfortunately, if the jamming signal is only a single frequency within sub-band processing channel 106, then the turning off of the entirety of sub-band processing channel 106 will severely limit the effectiveness of receiver 102.

In some embodiments, the sub-band processing channels may be further divided into smaller and smaller sub-band processing channels. In this manner, the sub-band isolation to filter out nefarious signals will limit the detriment of turning off frequency bands that do not include such nefarious signals. However, as noted above, the increase in the number of sub bands drastically increases the operating costs of the device.

Using frequency hopping, the blocking of communication will be limited to periods in which interference lies in the same band in which transmission occurred. With a sufficient number of sub-bands, the probability of blocking is small, and the system performance is acceptable.

The probability of blocking versus the number of bands in a communication system that uses frequency hopping will now be described with reference to FIG. 2.

Figure 2:
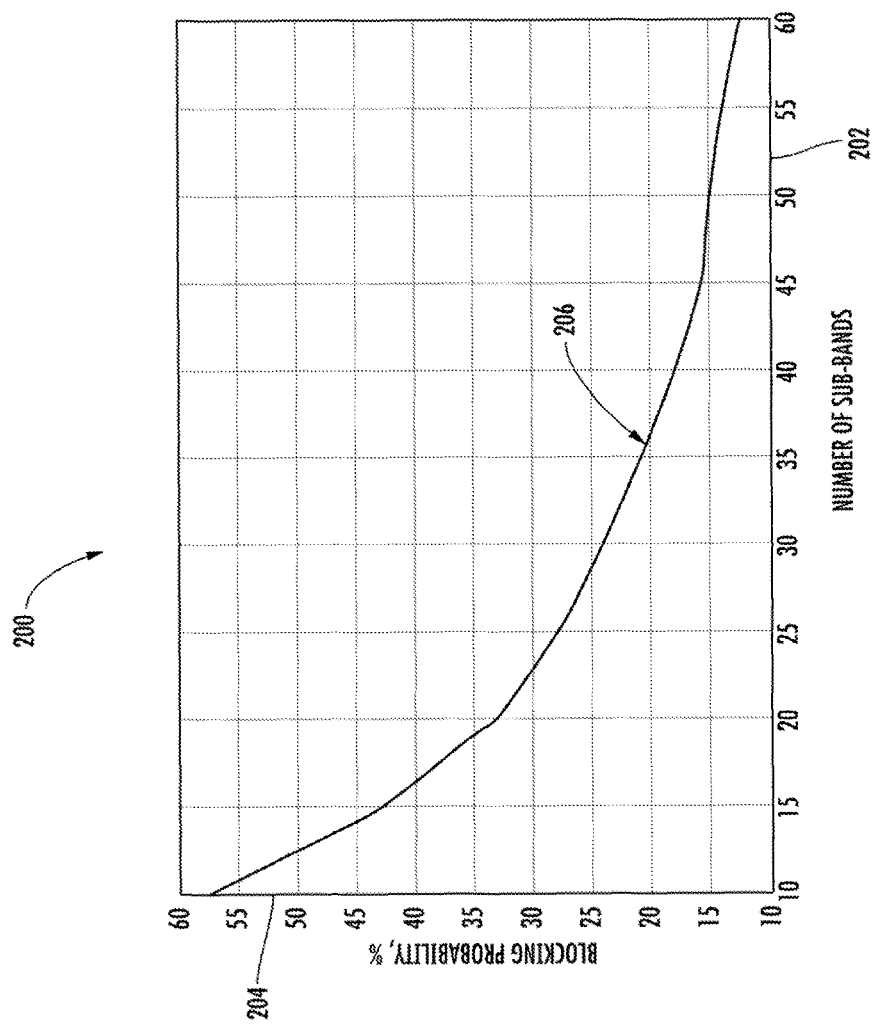
FIG. 2 illustrates a graph of the probability of a sub-band being blocked versus the number of sub-bands for a prior art frequency hopping communication system.

FIG. 2 illustrates a graph 200 of the probability of a sub-band being blocked versus the number of sub-bands for prior art frequency hopping communication receiver 102 of FIG. 1.

As illustrated in the figure, graph 200 includes an X-Axis 202, a Y-Axis 204, and a function 206.

X-Axis 202 represents the number of sub-bands used in receiver 102 of FIG. 1. Y-Axis 204 represents the probability of blocking in percent. Function 206 represents the probability of blocking for a given number of sub-bands.

A probability of being blocked below 15% is a realistic target for a communications system utilizing frequency hopping. Observing graph 200 it can be seen that there is over a 40% chance of blocking if only 15 sub-bands are used. To obtain a probability of blocking below 15%, nearly 50 sub-bands must be used. The large number of sub-bands needed to obtain a probability of blocking below 15% is cost prohibitive and adds significant amount of complexity to the communication system.

A problem with prior art receiver 102 used in a frequency hopping communication system is that each channel has an effect on the performance of the other channels, and design may involve a high number of variables due to extensive interaction between the channels. The inter-channel interactions also produce intermodulation and non-linear effects that negatively affect system performance.

A problem with prior art receiver 102 used in a frequency hopping communication system is that if any frequency channel within a sub-band has a sufficiently large amplitude so as to be blocked, the entire sub-band is shut down to prevent damage to the receiver. If any other received signal has a frequency within such a sub-band that is shut down, then the signal will not be processed. Of course one option is to increase the number of sub-bands, to reduce the likelihood of a received signal being blocked because its frequency lies within a blocked sub-band. However, the increased number of sub-bands drastically increases the real estate of the receiver and the power requirements for operation.

What is needed is a system and method for increasing the number of channels used in a frequency hopping communication system, while reducing interference in a sub-band.

Aspects of the present invention provide a system and method for using a filter controller and an adjustable narrow-band filter within each sub-band of a communication system. If there is interference within a sub-band, the filter controller will tune the adjustable narrow-band filter within the sub-band to the same frequency as the interference. Tuning the adjustable narrow-band filter to the same frequency as the interference will allow the interference to be eliminated preventing the blocking of the entire sub-band. In this manner, any sub-band can still be used in signal transmission despite interference.

Aspects of the present invention will now be further described with reference to FIGS. 3-5.

Figure 3:
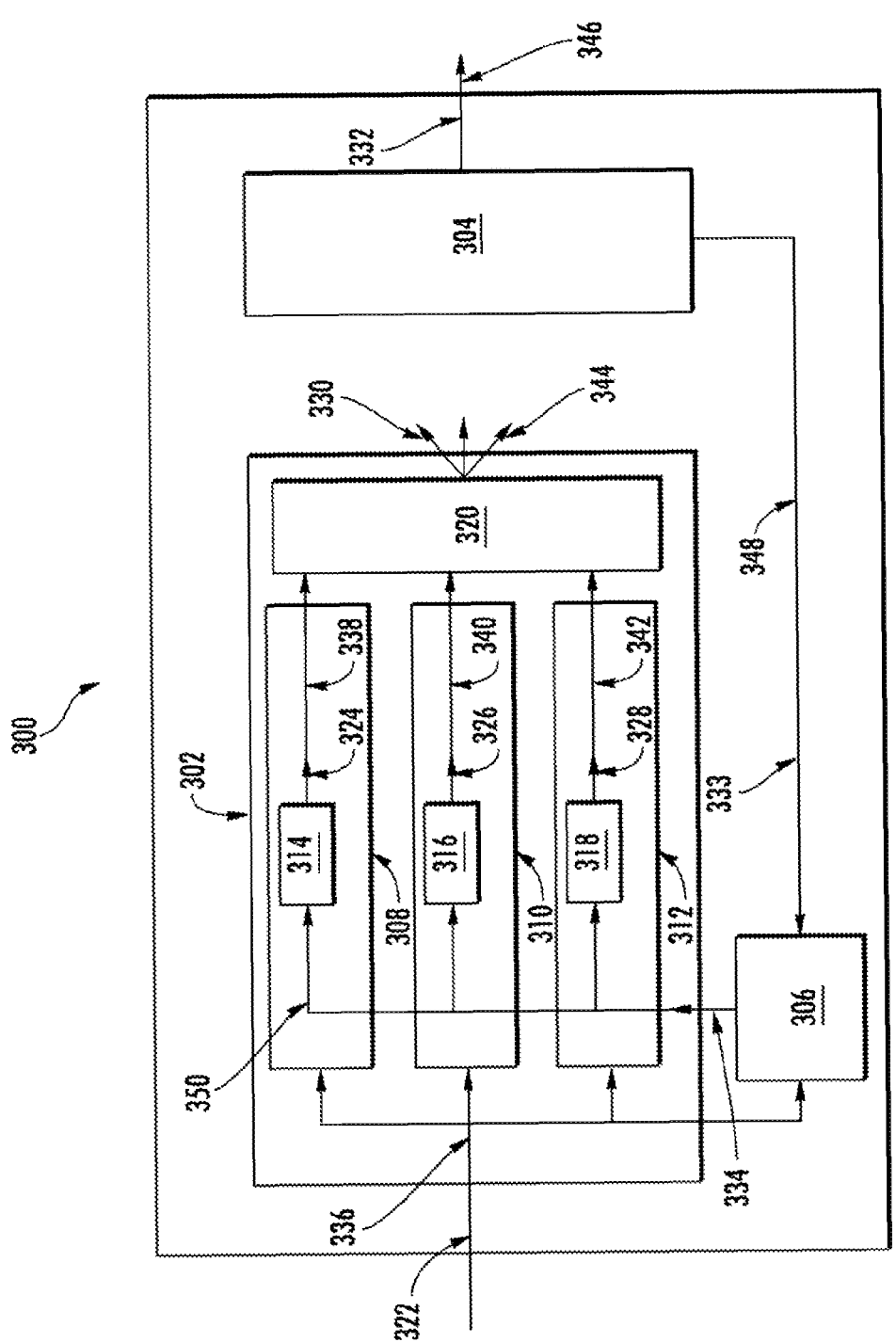
FIG. 3 illustrates a receiver for use in a frequency hopping scheme in accordance with aspects of the present invention.

FIG. 3 illustrates a transceiver 300 for use in a frequency hopping scheme in accordance with aspects of the present invention.

As illustrated in the figure, transceiver 300 includes a receiver (RX) 302, a transmitter 304, and a controller 306. Receiver 302 further includes a sub-band processing channel 308, a sub-band processing channel 310, a sub-band processing channel 312, a processing component 314, a processing component 316, a processing component 318, and a combiner 320.

Transmitter (TX) 304 transmits a transmission signal 332, via a communication channel 346. In this embodiment, transmitter 304 will be transmitting in a frequency hopping regime. In some cases, the frequencies at which transmitter 304 transmits might interfere with received signal 322 as received by sub-band processing channels 308, 310 and 312. As such, there is a possibility that transmitter 304 might transmit so as to unintentionally "jam" sub-band processing channels 308, 310 and 312. To avoid such situations, transmitter 304 will instruct controller 306 of the frequency hopping schedule so that controller 306 can take appropriate measures with sub-band processing channels 308, 310 and 312. Transmitter 304 transmits an instruction signal 333 to controller 306, via a communication line 348.

Controller 306 provides an instruction signal 334 to signal processing component 314, signal processing component 316, and signal processing component 318, via a communication line 350.

Sub-band processing channel 308 is a sub-band processing channel representing a first channel of the total bandwidth spectrum for which receiver 302 can receive. Sub-band processing channel 310 is a sub-band processing channel representing a second channel of the total bandwidth spectrum for which receiver 302 can receive. Sub-band processing channel 312 is a sub-band processing channel representing a third channel of the total bandwidth spectrum for which receiver 302 can receive. Sub-band processing channel 308, sub-band processing channel 310, and sub-band processing channel 312 are each mutually exclusive, meaning that no frequency is shared between any two sub-band processing channels.

Signal processing component 314, signal processing component 316, and signal processing component 318 are each arranged to receive signal 322, via communication line 336 and instruction signal 334, via communication line 350. Non-limiting examples of a signal processing component include a band pass filter, an integrator, a buffer, an amplifier, a limiter, and combinations thereof.

Signal processing component 314 is additionally operable to generate and provide a sub-signal 324 to combiner 320, via communication line 338. Signal processing component 316 is additionally operable to generate and provide a sub-signal 326 to combiner 320, via communication line 340. Signal processing component 318 is additionally operable to generate and provide a sub-signal 328 to combiner 320, via communication line 342.

Combiner 320 generates a processed signal 330 based on one of sub-signal 324, sub-signal 326, or sub-signal 328, to downstream components (not shown) via communication signal 344.

The operation of signal processing component 314, signal processing component 316, and signal processing component 318 will now be further described with reference to FIG. 4.

Figure 4:
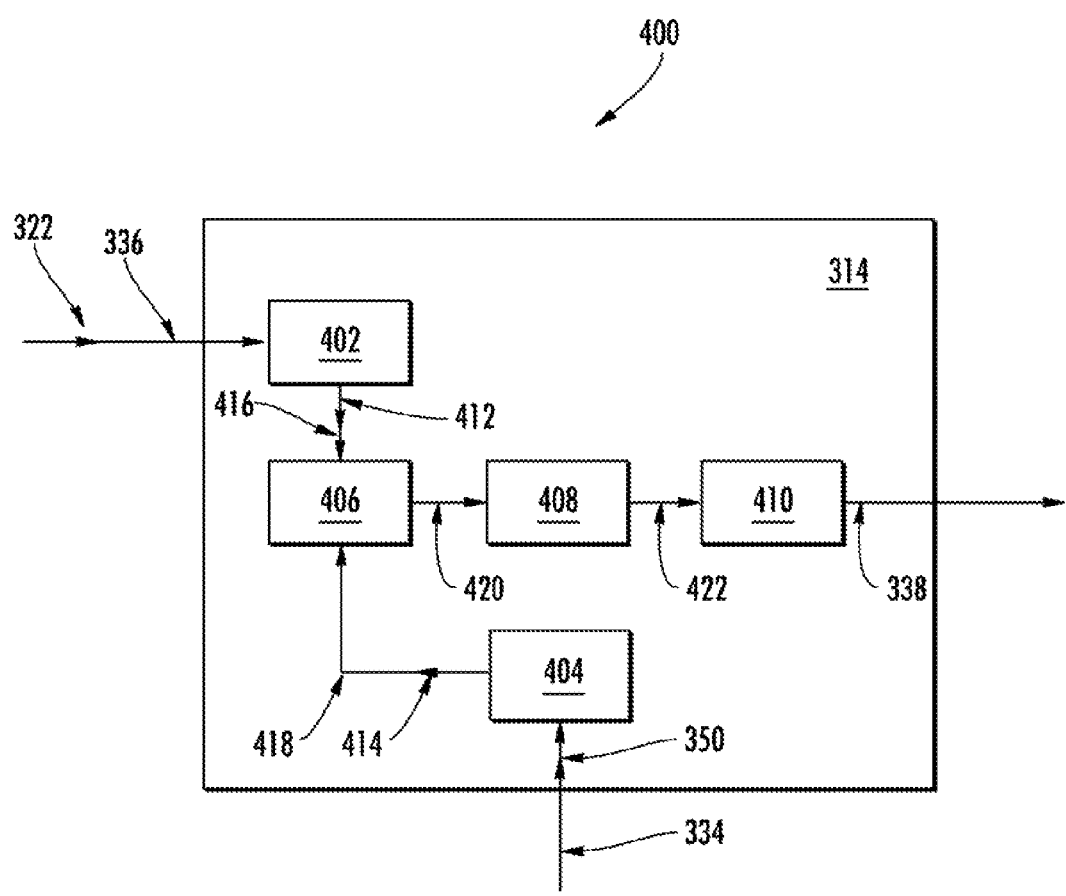
FIG. 4 illustrates the operation of an example signal processing component in accordance with aspects of the present invention.

FIG. 4 illustrates the operation of signal processing component 314 in accordance with aspects of the present invention. Each of signal processing component 314, signal processing component 316, and signal processing component 318 operate in a similar manner. For purposes of brevity, only operation of signal processing component 314 will be discussed.

As illustrated in the figure, signal processing component 314 includes an input band pass filter (BPF) 402, a filter controller 404, an adjustable narrow-band filter 406, a limiter/amplifier 408, and an output band pass filter (BPF) 410.

Input band pass filter 402 is arranged to receive received signal 322, via communication line 336 of FIG. 3. Input band pass filter 402 is additionally operable to generate a filtered signal 412 based on transmission signal 336. Input band pass filter 402 is further operable to provide filtered signal 412 to adjustable narrow-band filter 406, via communication line 416.

Filter controller 404 is arranged to receive instruction signal 334, via communication line 350 of FIG. 3. Filter controller 404 is additionally operable to provide tune signal 414, via communication line 418, in order to instruct adjustable narrow-band filter 404 to adjust its frequency.

Adjustable narrow-band filter 406 adjusts the frequency band of which it passes based on instruct signal 414. Adjustable narrow-band filter 406 is additionally operable to block the channel of filtered signal 412 that is at the frequency to which it is tuned. Adjustable narrow-band filter 406 further provides filtered signal 412 to limiter/amplifier 408, via communication line 420.

Limiter/amplifier 408 modifies filtered signal 412 in order to keep the amplitude below the limiting threshold of transmitter 304 of FIG. 3. Limiter/amplifier 408 additionally provides filtered signal 412 to output band pass filter 410, via communication line 420.

Output band pass filter 410 filters out any channel of filtered signal 412 that is outside of its frequency band. Output band pass filter additionally provides filtered signal 412 to combiner 320 of FIG. 3, via communication line 338.

Consider the situation in which filter controller 404 determines that there is interference within a channel of its sub-band. Filter controller 404 will then generate and provide tune signal 414 in order to instruct adjustable narrow-band filter 406 to adjust its pass band so as to create a notch filter that filters out the frequencies of the interference.

At this time, adjustable narrow-band filter 406 has received both filtered signal 412 and tune signal 414. Adjustable narrow-band filter 406 notches out the frequencies as instructed by tune signal 414. In this manner, only a small channel of the entire band that is supported by sub-band processing channel 308 of FIG. 3 is blocked, wherein the remaining channel of the band that is supported by sub-band processing channel 308 may still be used. After notch-filtering out the channel of filtered signal 412 that has signal on a frequency that corresponds to the frequency of the interference in the sub-band, adjustable narrow-band filter 406 will provide filtered signal 412 to limiter/amplifier 408, via communication line 422.

Amplifier/limiter 408 will then clip peak amplitudes of filtered signal 412 to avoid exceeding the linear response of the receiver and creating desensitization. Amplifier/limiter 408 will then provide filtered signal 412 to output band pass filter 410, via communication line 422.

Output band pass filter 410 will then filter out any channel of filtered signal 412 that is not within its sub-band. Output band pass filter 410 prevents any out of band intermodulation products generated by amplifier/limiter 408 that are generated by the front end of transceiver 300 of FIG. 3. After filtering filtered signal 412, output band pass filter 410 will provide filtered signal 412 to combiner 320 of FIG. 3, via communication line 338.

As described above with respect to input band pass filter 402 and filter controller 410, signal processing component 314 is a generic representation. In regards to the operation of transceiver 300, output band pass filter 410 would provide a sub-signal to combiner 320, via communication line 338, as shown in FIG. 3, that corresponds to one of signal processing component 314, signal processing component 316, or signal processing component 318.

Transceiver 300 may be used to receive information. To start, received signal 322 is sent to each of signal processing component 314, signal processing component 316, signal processing component 318 and controller 306, via communication line 336.

Controller 306 analyzes transmission signal 332 to determine its frequency. Suppose that in this example embodiment, controller 306 finds that transmission signal 332 was provided at a frequency that is within sub-band processing channel 310. In an example embodiment, controller 306 includes a spectrum analyzer or processor that is able to perform a Fourier transform on transmission signal 332 to determine the frequency composition. Further, in this example embodiment, controller 306 is able to determine the amplitude of each frequency contribution in transmission signal 332.

Still further, in some embodiments, controller 306 is able to compare amplitudes of each frequency contribution in transmission signal 332 with a predetermined amplitude threshold. The amplitude threshold may be set, for example, at an amplitude that is above an amplitude of an expected received signal or that is above an amplitude that will damage any of components within receiver 302. Any specific frequency contribution in transmission signal 332 that has an amplitude that is greater than the predetermined amplitude threshold is likely from an adversarial jamming device, or in some cases from transmitter 304. In either case, the prevent harm to receiver 302, such high power signals are identified in accordance with aspects of the present invention.

Still further, controller 306 is able to identify such high power signals within a broad spectrum of frequencies. Any band of frequencies in transmission signal 332 that has an amplitude that is greater than the predetermined amplitude threshold is likely from an adversarial jamming device and may be identified in accordance with aspects of the present invention.

Controller 306 then generates instruct signal 334 based on the analysis of transmission signal 332, which it then provides to each of signal processing component 314, signal processing component 316, and signal processing component 312, via communication line 350.

Next, each of signal processing component 314, signal processing component 316, and signal processing component 342 begin to process received signal 322, as received signal 322 falls within the appropriate pass band, as described in FIG. 4. For purposes of brevity, only the operation of signal processing component 314 will be discussed in detail at this time.

Now, consider the situation where a transmitter (not shown) is transmitting information, for receipt by transceiver 300, by periodically hopping through a plurality of frequencies with a predetermined band "frequency hopping," in a manner known to transceiver 300. In this manner, transceiver 300 can correspondingly periodically hop through enabling appropriate receiving bands of receiver 302 in order to receive the information transmitted by transceiver 300.

Now further consider that in this situation, a third party (not shown) attempts to disrupt the transfer of information from the transmitter (not shown) to transceiver 300 by blasting a high power signal in order to damage the components of transceiver 300. Such a high power signal may be a specific frequency, a band of frequencies, a periodically changing frequency or any combination thereof. In any event, presume that at some time, at least one of the received signals within as transmitted by the transmitter (not shown) will be of the same frequency of the high power signal blasted by the third party (not shown). In accordance with aspects of the present invention, this high powered blast will be identified and prevented from damaging component of transceiver 300.

Consider a situation wherein controller 306 determines that received signal 322 has a single frequency component that is below the predetermined threshold. In such a case, received signal 322 should not damage any components of transceiver 300 and should therefore be processed. For purposes of discussion, in this case, let received signal 322 have a single frequency component within sub-band processing channel 308. Controller 306 provides instruct signal 334 to signal processing component 314 to permit processing of received signal 322.

Returning to FIG. 4, filter controller 404 receives instruct signal 334, via communication line 350. Filter controller 404 analyzes instruct signal 404 and finds that there is no interference within its sub-band, which in this example embodiment is sub-band 308 of FIG. 3. Filter controller 404 then generates tune signal 414 based on this analysis, which it then provides to adjustable narrow-band filter 406, via communication line 418.

Input band pass filter 402 receives received signal 322, via communication line 336. Input band pass filter 402 only allows the channel of received signal 322 that is within its sub-band to pass through in order to generate sub-signal 324. Once generated, sub-signal 324 is provided to adjustable narrow-band filter 406, via communication line 416.

At this point, since there is no interference within the sub-band in which signal processing component 314 operates, adjustable narrow-band filter 406 provides sub-signal 324 without any filtering to amplifier/limiter 408, via communication line 420.

Amplifier/limiter 408 will then clip peak amplitudes of sub-signal 324 to avoid exceeding the linear response of the receiver and creating desensitization. Amplifier/limiter 408 will then provide sub-signal 324 to output band pass filter 410, via communication line 422.

Output band pass filter 410 will then filter out any channel of sub-signal 324 that is not within its sub-band. Output band pass filter 410 prevents any out of band intermodulation products generated by amplifier/limiter 408 that are generated by the front end of transceiver 300 of FIG. 3 or leakage from adjacent sub-bands, which in this example would be sub-band processing channel 310 and sub-band processing channel 312. After filtering sub-signal 324, output band pass filter 410 will provide sub-signal 324 to combiner 320 of FIG. 3, via communication line 338.

Referring back to FIG. 3, signal processing component 316 and signal processing component 318 operate in a manner that is identical to the operation of signal processing component 314 in order to generate sub-signal 326 and sub-signal 328. As received signal 322 changes frequency, signal processing component 316 provides sub-signal 326 to combiner 320, via communication line 340, and signal processing component 318 provides sub-signal 328 to combiner 320, via communication line 342 as appropriate.

Combiner 320 should only receive one of each of sub-signal 324, sub-signal 326, and sub-signal 328 at any one time. Since combiner 320 is providing a signal at the frequency of sub-band processing channel 308, it uses sub-signal 324 to generate processed signal 330 and ignores sub-signal 326 and sub-signal 328. Once generated, combiner 320 provides processed signal 330 to downstream components (not shown), via communication signal 344.

At future times, the appropriate channel of received signal 322 will be a frequency that is within sub-band processing channel 310 or 312.

Now consider a second situation wherein controller 306 determines that received signal 322 has a single frequency component that is above the predetermined threshold—e.g., a third party is attempting to jam transceiver 300 by blasting a high powered signal that is the same frequency of as the signal transmitted by the transmitter. In such a case, received signal 322 would damage some components of transceiver 300 and should therefore be filtered. For purposes of discussion, in this case, let received signal 322 have a single frequency component within sub-band processing channel 308. Controller 306 provides instruct signal 334 to signal processing component 314 to filter the frequency component of received signal 322 that has an amplitude above the predetermined threshold.

Returning to FIG. 4, filter controller 404 receives instruct signal 334, via communication line 350. Filter controller 404 analyzes instruct signal 334 and finds that frequency within its sub-band processing channel, which in this example embodiment is sub-band processing channel 308 of FIG. 3, that needs to be filtered. Filter controller 404 then generates tune signal 414 based on this analysis, which it then provides to adjustable narrow-band filter 406, via communication line 418.

Input band pass filter 402 receives received signal 322, via communication line 336. Input band pass filter 402 only allows the channel of received signal 322 that is within its sub-band to pass through in order to generate sub-signal 324. Once generated, sub-signal 324 is provided to adjustable narrow-band filter 406, via communication line 416.

At this point, tune signal 414 instructs adjustable narrow-band filter 406 to notch filter the channel of sub-signal 314 that has an amplitude that is greater than the predetermined threshold. Any remaining channel of sub-signal 314 will be passed to amplifier/limiter 408, via communication line 420. In this manner, amplifier/limiter 408 is prevented from being damaged by receiving the high powered signals.

In the above discussed embodiment, controller 306 analyzes received signal 322 to determine whether any frequency channels should be filtered in order to prevent damage to channels of receiver 302. However, there may be situations where transmitter 304, which is in close proximity to receiver 302, may damage channels of receiver 302 or cause interference with receiver 302. In accordance with another aspect of the present invention, controller 306 may notch filter channels of a received signal to counter transmissions from transmitter 304.

As described above, transmitter 304 transmits signal 332 under a frequency hopping scheme. Transmitter 304 informs controller 306 of the transmission schedule within the frequency hopping scheme by instruction signal 333 as provided over communication line 348. Controller 306 analyzes instruction signal 333 to determine the timing associated with each frequency at which transmission signal 332 will be transmitted. Suppose that in this example embodiment, controller 306 finds that transmission signal 332 is provided at a frequency that is within sub-band processing channel 310. Controller 306 will generate instruct signal 334 based on the analyses of instruction signal 333, which it will then provide to each of signal processing component 314, signal processing component 316, signal processing component 318.

Each of signal processing component 314, signal processing component 316, and signal processing component 318 will notch filter any received signals according the instruction signal. In this manner, transmissions from transmitter 304 will be prevented from interfering with the processing of received signals received by receiver 302.

In this example receiver 302, transmitter 304, controller 306, combiner 320, input band pass filter 402, filter controller 404, adjustable narrow-band filter 406, limiter/amplifier 408, and output band pass filter 410 are illustrated as individual devices. However, in some embodiments, at least two of receiver 302, transmitter 304, controller 306, combiner 320, input band pass filter 402, filter controller 404, adjustable narrow-band filter 406, limiter/amplifier 408, and output band pass filter 410 may be combined as a unitary device.

Further, in some embodiments, at least one of receiver 302, transmitter 304, controller 306, combiner 320, input band pass filter 402, filter controller 404, adjustable narrow-band filter 406, limiter/amplifier 408, and output band pass filter 410 may be implemented as a processor working in conjunction with a tangible processor-readable media for carrying or having processor-executable instructions or data structures stored thereon. Non-limiting examples of tangible processor-readable media include physical storage and/or memory media such as RAM, ROM, EEPROM, CD-ROM or other optical disk storage, magnetic disk storage or other magnetic storage devices, or any other medium which can be used to carry or store desired program code means in the form of processor-executable instructions or data structures and which can be accessed by special purpose computer. For information transferred or provided over a network or another communications connection (either hardwired, wireless, or a combination of hardwired or wireless) to a computer, the processor may properly view the connection as a processor-readable medium. Thus, any such connection may be properly termed a processor-readable medium. Combinations of the above should also be included within the scope of processor-readable media.

In prior art systems without the use of an adjustable narrow-band filter and filter controller, the interference cannot be blocked, which results in the signal and the interference being transmitted to an amplifier/limiter. When the signal and the interference arrive at the amplifier/limiter, it clips the peak amplitudes causing the signal to be lost in the noise of the interference, essentially blocking the entire sub-band. When this occurs, no information is able to be transmitted until the frequency at which the final signal should be transmitted exits the frequency range of the sub-band that contains the interference.

FIG. 5 illustrates a graph 500 of the probability of blocking versus the number of sub-bands used in a frequency hopping communication system in accordance with aspects of the present invention.

As illustrated in the figure, graph 500 includes an X-Axis 502, a Y-Axis 504, a function 506, and a function 508.

X-Axis 502 represents the number of sub-bands used in a frequency hopping communication system. Y-Axis 504 represents the probability of blocking in percent. Function 506 represents the probability of blocking for a given number of sub-bands in a prior art frequency hopping communication system. Function 508 represents the probability of blocking for a given number of sub-bands in a frequency hopping communication system in accordance with aspect of the present invention.

As discussed above in FIG. 2, a probability of being blocked below 15% is a realistic target for a frequency hopping communications system. From function 506, it can be seen that using a prior art frequency hopping communication system, there is over a 40% probability of blocking if 15 sub-bands are used.

Meanwhile, looking at function 508, a frequency hopping communication system in accordance with aspects of the present invention has a 10% probability of being blocked using 15 sub-bands, which is already well below the target blocking probability. The reduction in the number of sub-bands needed to achieve a blocking probability below 15% reduces inter-channel interactions that produce intermodulation products that can result in a channel being blocked.

In summary, a problem with prior art frequency hopping communication devices is that if there is interference within a sub-band, the sub-band is essentially blocked. In this case, no information can be transmitted while a signal is to be transmitted at a frequency that is the same as the frequency of the sub-band that contains interference. Due to this, in order to achieve an acceptable blocking probability, a large number of sub-bands need to be used. The large number of sub-bands creates its own unique problems due intermodulation products resulting from the extensive interaction between channels.

The present invention provides a system and method for preventing an entire sub-band from being blocked by removing interference within that sub-band. A filter controller is used to tune an adjustable narrow-band filter to the frequency of the interference that is within a sub-band. The adjustable narrow-band filter removes the channel of the sub-band that has interference, allowing the rest of the sub-band to pass through. In this manner, interference can only block a small channel of a sub-band, and a signal may still be transmitted.

Therefore, using a filter controller and an adjustable narrow-band filter to remove interference leads to a reduction in the number of sub-bands needed to achieve an acceptable blocking probability. The reduction in the number of sub-bands also reduces intermodulation products that arise from interactions between adjacent sub-bands.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A receiver comprising:
an input terminal operable to receive a signal having a frequency within a bandwidth;
a first input band pass filter arranged to receive the received signal and being operable to pass signals within a first channel of the bandwidth;
a second input band pass filter arranged to receive the received signal and being operable to pass signals within a second channel of the bandwidth, the second channel of the bandwidth being mutually exclusive with the first channel of the bandwidth;
a first signal processor operable to generate a first processed signal based on the received signal;
a second signal processor operable to generate a second processed signal based on the received signal;
a first adjustable band pass filter arranged to receive the signals within the first channel of the bandwidth of said first input band pass filter and being operable to pass signals within a first sub-channel of the first channel of the bandwidth and to pass signals within a second sub-channel of the first channel of the bandwidth, the second sub-channel of the first channel of the bandwidth being mutually exclusive with the first sub-channel of the first channel of the bandwidth;
a second adjustable band pass filter arranged to receive the signals within the second channel of the bandwidth of said second input band pass filter and being operable to pass signals within a first sub-channel of the second channel of the bandwidth and to pass signals within a second sub-channel of the second channel of the bandwidth, the second sub-channel of the second channel of the bandwidth being mutually exclusive with the first sub-channel of the second channel of the bandwidth;
a controller operable to detect when the received signal is within the first sub-channel of the first channel of the bandwidth and has an amplitude greater than a first threshold, to detect when the received signal is within the second sub-channel of the first channel of the bandwidth and has an amplitude greater than a second threshold, to detect when the received signal is within the first sub-channel of the second channel of the bandwidth and has an amplitude greater than a third threshold and to detect when the received signal is within the second sub-channel of the second channel of the bandwidth and has an amplitude greater than a fourth threshold, said controller being further operable to output a first filter signal when the received signal is within the first sub-channel of the first channel of the bandwidth and has an amplitude greater than a first threshold, to output a second filter signal when the received signal is within the second sub-channel of the first channel of the bandwidth and has an amplitude greater than a second threshold, to output a third filter signal when the received signal is within the first sub-channel of the second channel of the bandwidth and has an amplitude greater than a third threshold and to output a fourth filter signal when the received signal is within the second sub-channel of the second channel of the bandwidth and has an amplitude greater than a fourth threshold;
a tuner operable to generate a tuning signal based on a predetermined function; and
an output port operable to output an output signal based on the first processed signal, the second processed signal, the first filter signal, the second filter signal, the third filter signal, the fourth filter signal and the tuning signal.

2. The receiver of claim 1, wherein said first signal processor comprises a limiter.

3. The receiver of claim 2, wherein said first signal processor further comprises an amplifier.

4. The receiver of claim 3, further comprising:
a first output band pass filter arranged to receive the first processed signal and being operable to pass signals within the first channel of the bandwidth; and
a second output band pass filter arranged to receive the second processed signal and being operable to pass signals within the second channel of the bandwidth.

5. The receiver of claim 1, wherein said first signal processor further comprises an amplifier.

6. The receiver of claim 5, further comprising:
a first output band pass filter arranged to receive the first processed signal and being operable to pass signals within the first channel of the bandwidth; and
a second output band pass filter arranged to receive the second processed signal and being operable to pass signals within the second channel of the bandwidth.

7. The receiver of claim 1, further comprising:
a first output band pass filter arranged to receive the first processed signal and being operable to pass signals within the first channel of the bandwidth; and
a second output band pass filter arranged to receive the second processed signal and being operable to pass signals within the second channel of the bandwidth.

8. A receiver comprising:
an input terminal operable to receive a signal having a frequency, fi, within a bandwidth;
a first input band pass filter arranged to receive the received signal and being operable to pass signals within a first channel of the bandwidth;
a second input band pass filter arranged to receive the received signal and being operable to pass signals within a second channel of the bandwidth, the second channel of the bandwidth being mutually exclusive with the first channel of the bandwidth;
a first signal processor operable to generate a first processed signal based on the received signal;
a second signal processor operable to generate a second processed signal based on the received signal;
a first adjustable band pass filter arranged to receive the signals within the first channel of the bandwidth of said first input band pass filter and being operable to pass signals within a first sub-channel of the first channel of the bandwidth and to pass signals within a second sub-channel of the first channel of the bandwidth, the second sub-channel of the first channel of the bandwidth being mutually exclusive with the first sub-channel of the first channel of the bandwidth;
a second adjustable band pass filter arranged to receive the signals within the second channel of the bandwidth of said second input band pass filter and being operable to pass signals within a first sub-channel of the second channel of the bandwidth and to pass signals within a second sub-channel of the second channel of the bandwidth, the second sub-channel of the second channel of the bandwidth being mutually exclusive with the first sub-channel of the second channel of the bandwidth;
a controller operable to receive an instruction signal indicating when the received signal will be within the first sub-channel of the first channel of the bandwidth and will have an amplitude greater than a first threshold, when the received signal will be within the second sub-channel of the first channel of the bandwidth and will have an amplitude greater than a second threshold, when the received signal will be within the first sub-channel of the second channel of the bandwidth and will have an amplitude greater than a third threshold and when the received signal will be within the second sub-channel of the second channel of the bandwidth and will have an amplitude greater than a fourth threshold, said controller being operable to output a first filter signal when the received signal is within the first sub-channel of the first channel of the bandwidth and has an amplitude greater than a first threshold, to output a second filter signal when the received signal is within the second sub-channel of the first channel of the bandwidth and has an amplitude greater than a second threshold, to output a third filter signal when the received signal is within the first sub-channel of the second channel of the bandwidth and has an amplitude greater than a third threshold and to output a fourth filter signal when the received signal is within the second sub-channel of the second channel of the bandwidth and has an amplitude greater than a fourth threshold;
a tuner operable to generate a tuning signal based on a predetermined function; and
an output port operable to output an output signal based on the first processed signal, the second processed signal, the first filter signal, the second filter signal, the third filter signal, the fourth filter signal and the tuning signal.

9. The receiver of claim 8, wherein said first signal processor comprises a limiter.

10. The receiver of claim 9, wherein said first signal processor further comprises an amplifier.

11. The receiver of claim 10, further comprising:
a first output band pass filter arranged to receive the first processed signal and being operable to pass signals within the first channel of the bandwidth; and
a second output band pass filter arranged to receive the second processed signal and being operable to pass signals within the second channel of the bandwidth.

12. The receiver of claim 8, wherein said first signal processor further comprises an amplifier.

13. The receiver of claim 12, further comprising:
a first output band pass filter arranged to receive the first processed signal and being operable to pass signals within the first channel of the bandwidth; and
a second output band pass filter arranged to receive the second processed signal and being operable to pass signals within the second channel of the bandwidth.

14. The receiver of claim 8, further comprising:
a first output band pass filter arranged to receive the first processed signal and being operable to pass signals within the first channel of the bandwidth; and
a second output band pass filter arranged to receive the second processed signal and being operable to pass signals within the second channel of the bandwidth.

15. The receiver of claim 8, further comprising:
a first transmitter operable to transmit a first transmission signal at a first time within the first sub-channel of the first channel of the bandwidth;
a second transmitter operable to transmit a second transmission signal at a second time within the second sub-channel of the first channel of the bandwidth;

a third transmitter operable to transmit a third transmission signal at a third time within the first sub-channel of the second channel of the bandwidth;

a fourth transmitter operable to transmit a fourth transmission signal at a fourth time within second sub-channel of the second channel of the bandwidth; and an instructor operable to generate the instruction signal based on the first transmission signal, the second transmission signal, the third transmission signal and the fourth transmission signal.

16. The receiver of claim 15, wherein said first signal processor comprises a limiter.

17. The receiver of claim 16, wherein said first signal processor further comprises an amplifier.

18. The receiver of claim 17, further comprising:

a first output band pass filter arranged to receive the first processed signal and being operable to pass signals within the first channel of the bandwidth; and a second output band pass filter arranged to receive the second processed signal and being operable to pass signals within the second channel of the bandwidth.

19. A method comprising:

receiving, via an input terminal, a received signal having a frequency, fi, within a bandwidth;

receiving, via a first input band pass filter, the received signal;

passing, via the first input band pass filter, signals within a first channel of the bandwidth;

receiving, via a second input band pass filter, the received signal;

passing, via the second input band pass filter, signals within a second channel of the bandwidth, the second channel of the bandwidth being mutually exclusive with the first channel of the bandwidth;

generating, via a first signal processor, a first processed signal based on the received signal;

generating, via a second signal processor, a second processed signal based on the received signal;

receiving, via a first adjustable band pass filter that is operable to pass signals within a first sub-channel of the first channel of the bandwidth and to pass signals within a second sub-channel of the first channel of the bandwidth, the second sub-channel of the first channel of the bandwidth being mutually exclusive with the first sub-channel of the first channel of the bandwidth, the signals within the first channel of the bandwidth of the first input band pass filter;

receiving, via a second adjustable band pass filter that is operable to pass signals within a first sub-channel of the second channel of the bandwidth and to pass signals within a second sub-channel of the second channel of the bandwidth, the second sub-channel of the second channel of the bandwidth being mutually exclusive with the first sub-channel of the second channel of the bandwidth, the signals within the second channel of the bandwidth of said second input band pass filter;

detecting, via a controller, when the received signal is within the first sub-channel of the first channel of the bandwidth and has an amplitude greater than a first threshold;

outputting, via the controller, a first filter signal when the received signal is within the first sub-channel of the first channel of the bandwidth and has an amplitude greater than a first threshold;

generating, via a tuner, tuning signal based on a predetermined function; and outputting, via an output port, an output signal based on the first processed signal, the second processed signal, the first filter signal and the tuning signal.

20. The method of claim 19, wherein said generating, via a first signal processor, a first processed signal based on the received signal comprises generating, via a limiter, the first processed signal.

* * * * *